US010554751B2

(12) United States Patent
Vedula

(10) Patent No.: US 10,554,751 B2
(45) Date of Patent: Feb. 4, 2020

(54) INITIAL RESOURCE PROVISIONING IN CLOUD SYSTEMS

(71) Applicant: Oracle International Corporation, Redwood Shores, CA (US)

(72) Inventor: Venkata Naga Ravi Kiran Vedula, Belmont, CA (US)

(73) Assignee: Oracle International Corporation, Redwood Shores, CA (US)

(*) Notice: Subject to any disclaimer, the term of this patent is extended or adjusted under 35 U.S.C. 154(b) by 778 days.

(21) Appl. No.: 15/008,087

(22) Filed: Jan. 27, 2016

(65) Prior Publication Data

US 2017/0214632 A1 Jul. 27, 2017

(51) Int. Cl.
*H04L 29/08* (2006.01)
*G06F 16/2457* (2019.01)

(52) U.S. Cl.
CPC .... *H04L 67/1097* (2013.01); *G06F 16/24578* (2019.01)

(58) Field of Classification Search
CPC . H04L 41/0896; H04L 47/70; H04L 41/5054; H04L 67/1008; H04L 67/1097; H04L 41/0893; H04L 41/5096; G06F 17/3053; G06F 9/455; G06F 9/5077; G06F 9/45558

See application file for complete search history.

(56) References Cited

U.S. PATENT DOCUMENTS

| 6,510,434 | B1 * | 1/2003 | Anderson | G06F 17/3061 |
| 7,065,764 | B1 * | 6/2006 | Prael | G06F 9/5072 703/2 |
| 7,788,671 | B2 * | 8/2010 | Black-Ziegelbein | G06F 9/5061 709/220 |
| 8,166,152 | B1 * | 4/2012 | Delcheva | G06F 11/302 707/634 |
| 8,180,871 | B2 | 5/2012 | Brittenham et al. | |
| 8,769,531 | B2 * | 7/2014 | Anderson | G06F 9/5077 718/1 |
| 8,782,215 | B2 | 7/2014 | Pechanec et al. | |
| 8,850,172 | B2 | 9/2014 | Dietrich et al. | |

(Continued)

OTHER PUBLICATIONS

Slamecka, V. (Aug. 23, 1998). Information processing. In Encyclopedia Britannica online. Retrieved from https://www.britannica.com/technology/information-processing.*

(Continued)

*Primary Examiner* — Viet D Vu
*Assistant Examiner* — Timothy Sowa
(74) *Attorney, Agent, or Firm* — Kraguljac Law Group, LLC

(57) ABSTRACT

A method of provisioning cloud-based applications includes receiving requests from computer systems to provision applications available in a cloud computing environment, assigning each of the computer systems to a first resource instance in the cloud computing environment such that the applications are executed for each of the plurality of computer systems on the first resource instance, monitoring usage of resources for each of the computer systems, grouping each of the computer systems into groups based on the usage of the resources, allocating a second resource instance, and reassigning computer systems in a first group from the first resource instance to the second resource instance.

20 Claims, 11 Drawing Sheets

(56) References Cited

U.S. PATENT DOCUMENTS

| | | | |
|---|---|---|---|
| 8,990,551 B2 | 3/2015 | Shafi | |
| 9,015,320 B2 | 4/2015 | Rice et al. | |
| 9,065,783 B2* | 6/2015 | Ding | G06F 9/505 |
| 9,253,253 B1* | 2/2016 | Bhattacharyya | H04L 67/1008 |
| 9,497,136 B1* | 11/2016 | Ramarao | G06F 9/45558 |
| 9,531,607 B1* | 12/2016 | Pai | H04L 43/08 |
| 9,632,991 B2 | 4/2017 | Straub et al. | |
| 9,665,560 B2 | 5/2017 | Saadi | |
| 9,672,123 B2 | 6/2017 | Duggana et al. | |
| 9,684,562 B2* | 6/2017 | Bell | G06F 11/1438 |
| 9,886,254 B2 | 2/2018 | Vedula et al. | |
| 9,912,609 B2 | 3/2018 | Jacob et al. | |
| 9,934,098 B2* | 4/2018 | Bell | G06F 11/1438 |
| 2005/0261875 A1* | 11/2005 | Shrivastava | G06F 11/0709 |
| | | | 702/183 |
| 2006/0095917 A1* | 5/2006 | Black-Ziegelbein | |
| | | | G06F 9/5061 |
| | | | 718/104 |
| 2007/0011195 A1* | 1/2007 | Kutsumi | G06Q 30/02 |
| 2011/0055712 A1* | 3/2011 | Tung | G06F 9/5072 |
| | | | 715/738 |
| 2011/0131309 A1* | 6/2011 | Akiyama | H04L 12/14 |
| | | | 709/223 |
| 2011/0191477 A1* | 8/2011 | Zhang | G06F 15/173 |
| | | | 709/226 |
| 2012/0226796 A1* | 9/2012 | Morgan | H04L 12/1453 |
| | | | 709/224 |
| 2012/0303816 A1* | 11/2012 | Kannan | G06F 9/50 |
| | | | 709/226 |
| 2012/0304169 A1* | 11/2012 | Anderson | G06F 9/5077 |
| | | | 718/1 |
| 2013/0144990 A1* | 6/2013 | Gao | G06F 9/5072 |
| | | | 709/220 |
| 2013/0160024 A1 | 6/2013 | Shtilman et al. | |
| 2013/0227560 A1* | 8/2013 | McGrath | G06F 9/45558 |
| | | | 718/1 |
| 2013/0304904 A1* | 11/2013 | Mouline | H04L 43/045 |
| | | | 709/224 |
| 2014/0344808 A1* | 11/2014 | Banerjee | G06F 9/455 |
| | | | 718/1 |
| 2014/0365662 A1* | 12/2014 | Dave | G06F 9/45533 |
| | | | 709/226 |
| 2015/0172204 A1* | 6/2015 | Anderson | H04L 47/70 |
| | | | 709/224 |
| 2015/0172206 A1* | 6/2015 | Anderson | H04L 47/70 |
| | | | 709/226 |
| 2015/0281032 A1* | 10/2015 | Bragstad | H04L 41/0806 |
| | | | 709/219 |
| 2015/0341230 A1* | 11/2015 | Dave | H04L 41/5058 |
| | | | 705/7.29 |
| 2016/0014089 A1* | 1/2016 | Kim | H04L 63/0281 |
| | | | 713/153 |
| 2016/0094639 A1* | 3/2016 | Bhattacharyya | H04L 67/1008 |
| | | | 709/219 |
| 2016/0156567 A1* | 6/2016 | Miyahara | H04L 12/4641 |
| | | | 709/226 |
| 2016/0321091 A1* | 11/2016 | Cropper | G06F 9/45533 |
| 2017/0024293 A1* | 1/2017 | Bell | G06F 11/1438 |
| 2017/0078250 A1* | 3/2017 | Barsness | H04L 63/0428 |
| 2017/0116040 A1* | 4/2017 | Cropper | G06F 9/5077 |
| 2017/0149681 A1* | 5/2017 | Chen | H04L 47/70 |

OTHER PUBLICATIONS

Z/OS Capacity Provisioning, IBM z/OS Capacity Provisioning, Available on Internet at http://www-03.ibm.com/systems/z/os/zos/features/cpm/index.html, Accessed on Aug. 21, 2015, 2 pages.

Tang et al., Dynamic Request Redirection and Elastic Service Scaling in Cloud-Centric Media Networks, IEEE Transactions on Multimedia, vol. 16, No. 5, Aug. 2014, 13 pages.

* cited by examiner

| Factor | System 1 | System 2 | System 3 | System 4 | System 5 |
|---|---|---|---|---|---|
| DB Operations | 5 | 8 | 9 | 6 | 10 |
| File Reads | 5 | 5 | 1 | 0 | 2 |
| Index Builds | 2 | 2 | 2 | 2 | 2 |
| Search Query | 1 | 2 | 2 | 1 | 10 |
| Document Store | 5 | 5 | 4 | 2 | 5 |

INITIAL RESOURCE PROVISIONING IN CLOUD SYSTEMS

BACKGROUND

Cloud provisioning generally refers to a process for the integration and deployment of cloud computing resources for an enterprise infrastructure. This may incorporate policies, procedures, business rules, and enterprise objectives in sourcing cloud services from a cloud service provider. The provisioning process may define how, when, and what an enterprise customer will receive from the cloud-based service. These services may be internal and accessible by the enterprise customer itself, or may be public/hybrid cloud applications that are available to clients of the enterprise customer. From the perspective of the cloud-based service, the provisioning process may include the supply and assignment of required cloud resources (hardware/software) to the customer as a resource instance. For example, this may include the creation of virtual machines, the allocation of storage memory devices, and/or the granting of access to restricted cloud resources.

BRIEF SUMMARY

In some embodiments, a method of provisioning cloud-based applications may include receiving requests from a plurality of computer systems to provision applications available in a cloud computing environment, and assigning each of the plurality of computer systems to a first resource instance in the cloud computing environment such that the applications may be executed for each of the plurality of computer systems on the first resource instance. The method may also include monitoring usage of resources in the first resource instance for each of the plurality of computer systems, and grouping each of the plurality of computer systems into a plurality of groups based on the usage of the resources in the first resource instance. The method may additionally include allocating a second resource instance in the cloud computing environment, and reassigning computer systems in a first group in the plurality of groups from the first resource instance to the second resource instance.

In some embodiments, a non-transitory computer-readable medium may be presented. The computer-readable memory may comprise a sequence of instructions which, when executed by one or more processors, causes the one or more processors to perform operations comprising receiving requests from a plurality of computer systems to provision applications available in a cloud computing environment, and assigning each of the plurality of computer systems to a first resource instance in the cloud computing environment such that the applications may be executed for each of the plurality of computer systems on the first resource instance. The operations may also include monitoring usage of resources in the first resource instance for each of the plurality of computer systems, and grouping each of the plurality of computer systems into a plurality of groups based on the usage of the resources in the first resource instance. The operations may additionally include allocating a second resource instance in the cloud computing environment, and reassigning computer systems in a first group in the plurality of groups from the first resource instance to the second resource instance.

In some embodiments, a system may be presented. The system may include one or more processors and one or more memory devices. The one or more memory devices may comprise instructions that, when executed by the one or more processors, cause the one or more processors to perform operations comprising receiving requests from a plurality of computer systems to provision applications available in a cloud computing environment, and assigning each of the plurality of computer systems to a first resource instance in the cloud computing environment such that the applications may be executed for each of the plurality of computer systems on the first resource instance. The operations may also include monitoring usage of resources in the first resource instance for each of the plurality of computer systems, and grouping each of the plurality of computer systems into a plurality of groups based on the usage of the resources in the first resource instance. The operations may additionally include allocating a second resource instance in the cloud computing environment, and reassigning computer systems in a first group in the plurality of groups from the first resource instance to the second resource instance.

In various embodiments, one or more of the following features may be implemented in any combination and without limitation. The first resource instance may include a virtual machine such as a Java Virtual Machine, a message-oriented middleware server such as a Java Messaging Service server, a database server, a Simple Mail Transfer Protocol server, a file server, and/or a router. The operations/method may also include, after reassigning the computer systems in the first group, receiving a request from a first computer system to provision at least one of the applications available in the cloud computing environment, determining that the first computer system has requested dedicated instances for capacity or performance reasons, and assigning the first computer system to the first resource instance. The operations/method may also include, after reassigning the computer systems in the first group, receiving a request from a first computer system to provision at least one of the applications available in the cloud computing environment, determining that the first computer system has requested dedicated instances for compliance reasons; and assigning the first computer system to a dedicated resource instance instead of the first resource instance. Monitoring the usage of the resources in the first resource instance for each of the plurality of computer systems may include generating log files for each of the plurality of computer systems, generating metrics on one or more file servers in the first resource instance, generating metrics based on queries to one or more database servers in the first resource instance, and/or performing logging such as Java logging, management and monitoring application queries such as Java Management Extension queries, and database queries. The operations/method may also include identifying a plurality of usage factors that are shared by each of the plurality of computer systems as they use the first resource instance. The plurality of usage factors may be identified by a background process that periodically scans usage logs, metrics on one or more file servers, and metrics based on queries to one or more database servers. The plurality of usage factors may be identified by identifying a set of most-frequently-used words in a usage log. The plurality of usage factors may be identified by identifying metrics with a highest numerical value. Grouping each of the plurality of computer systems into a plurality of groups may include generating scores for each of a plurality of usage factors for each of the plurality of computer systems, and statistically grouping the plurality of computer systems based on proximities of the scores for each of the plurality usage factors. Allocating the second resource instance in the cloud computing environment may include allocating a plurality of computing resources according to the first resource instance, and increasing or decreasing a number of particular types of computing resources in the second resource instance according to the usage of the resources in the first resource instance. Allocating the second resource instance in the cloud computing environment may include allocating a plurality of computing resources according to usage requirements of the computer systems in the first group as determined by the usage of the resources in the first resource instance.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1:
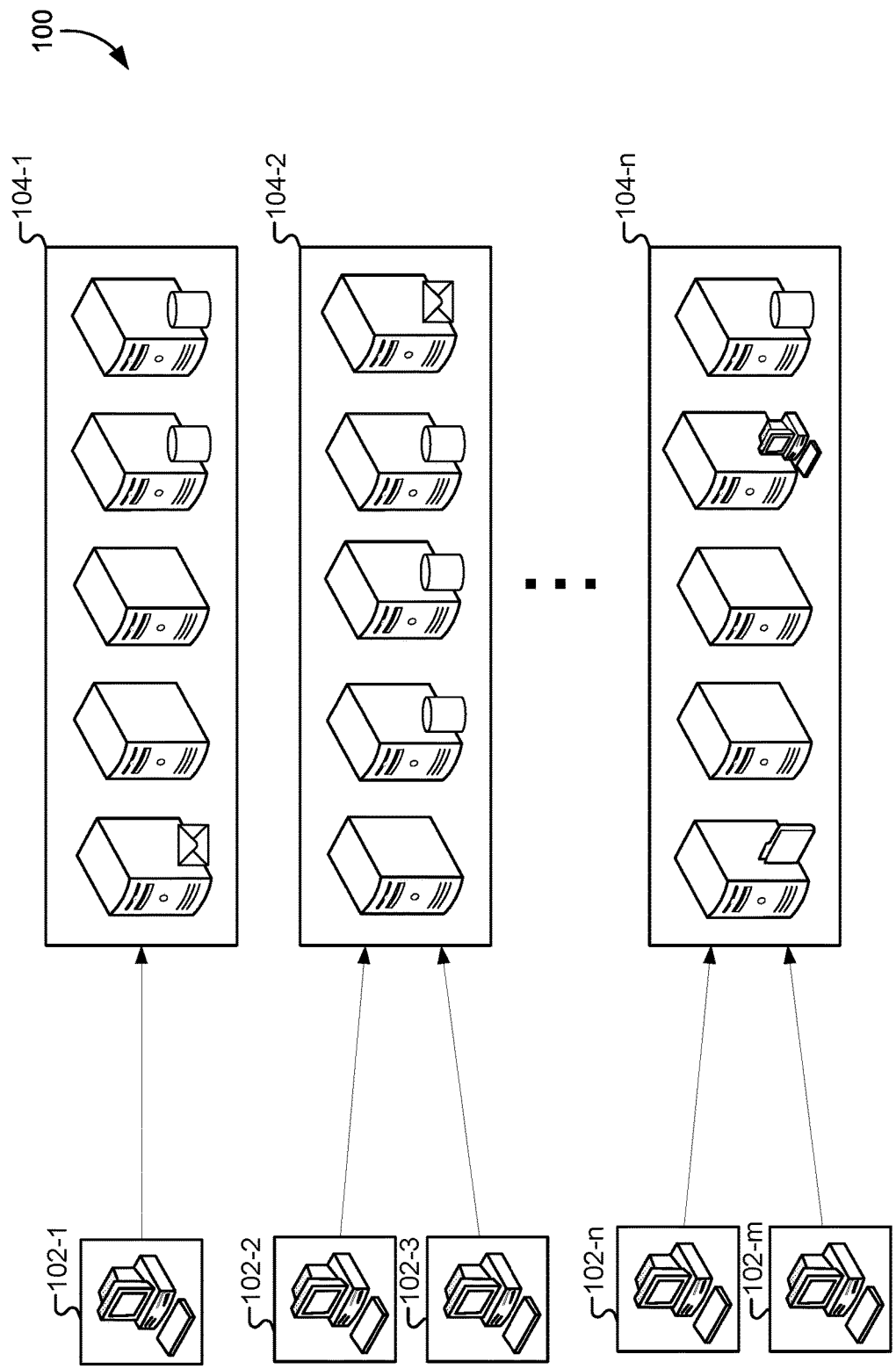
FIG. 1 illustrates a simplified block diagram of multiple computer systems with applications provisioned on multiple resource instances, according to some embodiments.

Described herein, are embodiments for efficiently provisioning applications and services. When a customer orders a service, such as an application to be run on a cloud-based service under a Software as a Service (SaaS) model, hardware and/or software resources in the cloud service must be provisioned, or "made available" to the customer. Hardware resources, such as servers, processors, disk arrays, routers, and so forth, need to be installed and made available. Software resources, such as email servers, virtual machines, database management systems, and so forth need to be installed on the hardware resources and configure to operate and interact with the customer's system. Under the SaaS model, applications and data may need to be densely packed on available hardware and software in order to maximize the services provided while minimizing cost to the cloud service. In short, customers expect the cost benefits of shared homogeneous hardware/software, while receiving performance and service that would more typically be provided by dedicated hardware/software. Cloud services are faced with this constant challenge of balancing performance with hardware/software cost.

Compounding the problem is the fact that customers typically do not know or accurately predict how provisioned resources in the cloud service will be used. Most customers can only provide an estimate of a number of users that will access the cloud service. Cloud services then have to estimate what resources will be needed and when. Additionally, many customers do not "go live" as soon as the resources are provisioned. Customers will generally request that cloud resources be provisioned weeks or months before their service actually goes live. Usage over time is also not typically constant. Many customers begin their usage pattern small and ramp up over time. Customers may purchase new services over time, and/or user requests may vary significantly. All of these factors make it very difficult to match the resource footprint allocated to each customer at the cloud service with the actual resource usage of the customer over time.

The embodiments described herein provide methods, systems, and devices that provide a one-size-fits-all "landing pad" for provisioning new customer requests. The so-called landing pad may be comprised of a universal set of cloud resources that are designed to handle almost all new provisioning requests. The landing pad is essentially a resource instance that can handle diverse provisioning requests. When a new provisioning request is received from a customer, the requested services may be provisioned for the customer on the landing pad resource instance. Initially, the customer's services will run on the landing pad resource instance as the service goes live to users. As the service is operated, the cloud service can monitor actual resource usage in the cloud service by the customer and users. Factors can be automatically detected that indicate major usage areas, and each customer utilizing the landing pad resource instance can generate a score for each factor. As long as the scores are generally close, all of the customers can continue to operate from the landing pad resource instance. However, as customer usage becomes more unique over time, the scores may begin to deviate from each other or from an optimal usage of the landing pad resources. At this point, the cloud service can subdivide the customers into groups that have similar usage characteristics of the cloud resources. In response, the cloud service can allocate new hardware/ software resource instances that more closely match the detected resource usage patterns and migrate corresponding customer groups to those new hardware/software resource instances.

As used herein, the term "customer" may refer to an entity that is requesting services from a cloud-based service. The term "user" may generally refer to clients of the customer. For example, a law firm may act as a customer requesting cloud-based IT services. Attorneys or IT specialists from within the law firm may act as users who interact with the cloud-based IT services.

As used herein, the term "computer system" may refer to any computing resources of a customer and/or a user. Because the present embodiments deals with a technical solution to solve inefficient provisioning, requests will generally be generated by the computer system of a customer/user. The term "application" will broadly refer to any service provided by the cloud-based service. For example, an application may include email service, data storage, customer service applications, IT support, and/or the like.

As used herein, the term "resource instance" may refer to any hardware/software that is provisioned by the cloud-based service in order to provide applications to a computer system or customer. Thus, the landing pad described above may generally include a resource instance, or a grouping of hardware and/or software that are dedicated to a particular purpose, such as servicing applications related to new customer requests. In some cases, the resource instances may simply be referred to as "resources" for short. A particular resource instance may be referred to as a "landing pad" or a "first resource instance" that represents a universal resource instance to which all or most incoming provisioning requests may be assigned. This particular resource instance will be described in greater detail below.

FIG. 1 illustrates a simplified block diagram 100 of multiple computer systems 102 with applications provisioned on multiple resource instances 104, according to some embodiments. When a customer needs a new service provided by a cloud-based service, a computer system 102 of the customer may send a request to the cloud-based service to purchase a particular application or group of applications. For example, a customer may request enterprise email services for 5000 users from a cloud-based service. The cloud-based service then provisions, or makes available, the necessary hardware resources (disk arrays, processors, memory devices, etc.) and installs the necessary software resources (email servers, contact databases, websites, etc.) in order to handle the email application. After the purchase is made by the customer, days or weeks may pass while the resources are being provisioned by the cloud-based service, until finally the customer is notified that the application is ready for use.

In some cases, a computer system 102-1 of a customer may request a dedicated resource instance 104-1 that is not shared with other computer systems of other customers. However, in most cases, different customer computer systems can share cloud-based resources. For example, computer systems 102-2, 102-3 may share resource instance 104-2. Prior to this disclosure, when a new request was received from a computer system to provision a new application, existing cloud-based services would perform load-balancing to try and allocate resources to the new application that were not as heavily used as others. While this may produce an allocation of resources that is efficient initially, this allocation may become very inefficient over time as actual resource usage patterns of the computer systems 102 evolve and go live.

Figure 2:
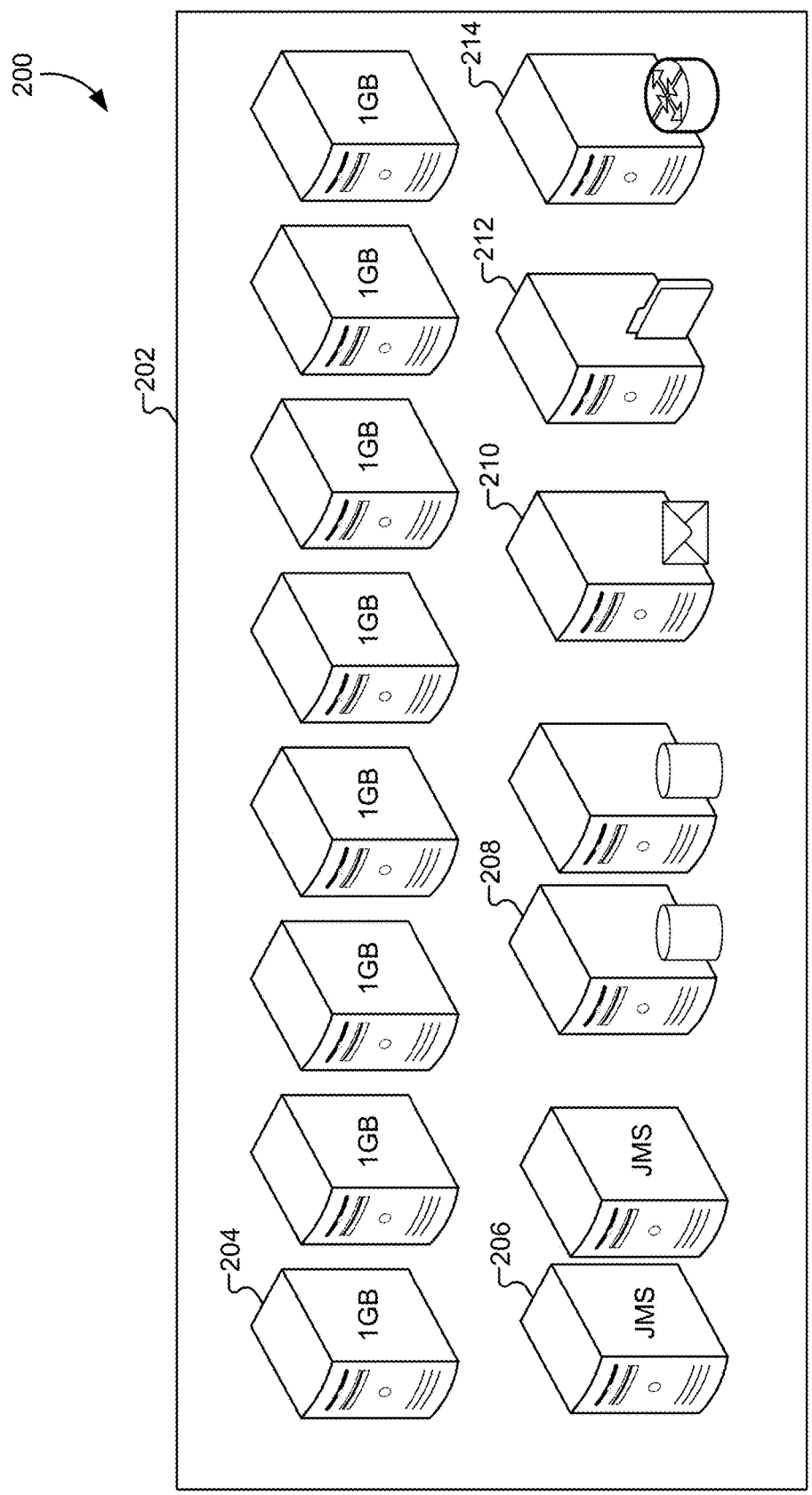
FIG. 2 illustrates a simplified block diagram of an exemplary landing pad resource allocation, according to some embodiments.

Instead of performing the initial load-balancing that is used by existing cloud-based systems, the embodiments described herein may use a universal landing pad, or initial resource instance, that is designed to handle most every known type of provisioning request. FIG. 2 illustrates a simplified block diagram 200 of an exemplary landing pad 202 resource instance, according to some embodiments. The particular resources allocated to the landing pad 202 may depend on the type of applications offered by the cloud-based service. As part of the provisioning process, a customer may be presented with a user interface (UI) that allows the customer to select a list of hosts, memory devices, databases, and/or other hardware/software resources from available resource pools provided by the cloud-based service. Therefore, the cloud-based service knows what hardware/software resource combinations are available for request by customers. Using this information, the cloud-based service can generate a universal combination of resources that will be able to service any provisioning request provided by the cloud-based service. For example, the logical union of minimum resources required for each available application may be used to define the resources needed for the landing pad 202. This universal combination of resources can be used to generate a resource instance, or landing pad 202, that acts as the default for all new incoming provisioning requests.

As will be understood by one having skill in the art, the particular arrangement and allocation of hardware/software resources to be provided in the landing pad 202 will be specific to each particular cloud-based service. However, the process described above for determining which hardware/software resources should be included in the landing pad may be the same or similar for each cloud-based service using the present embodiments. In one particular embodiment, the landing pad 202 may include eight virtual machines (such as Java Virtual Machines (JVMs)) 204 with 1 GB each running on a single host, two message-oriented middleware (such as Java Messaging Service (JMS)) servers 206, two database servers 208, one Simple Mail Transfer Protocol (SMTP) server 210, one file server 212, and one router 214. It will be understood that this allocation of resources is merely exemplary and not meant to be limiting.

Figure 3:
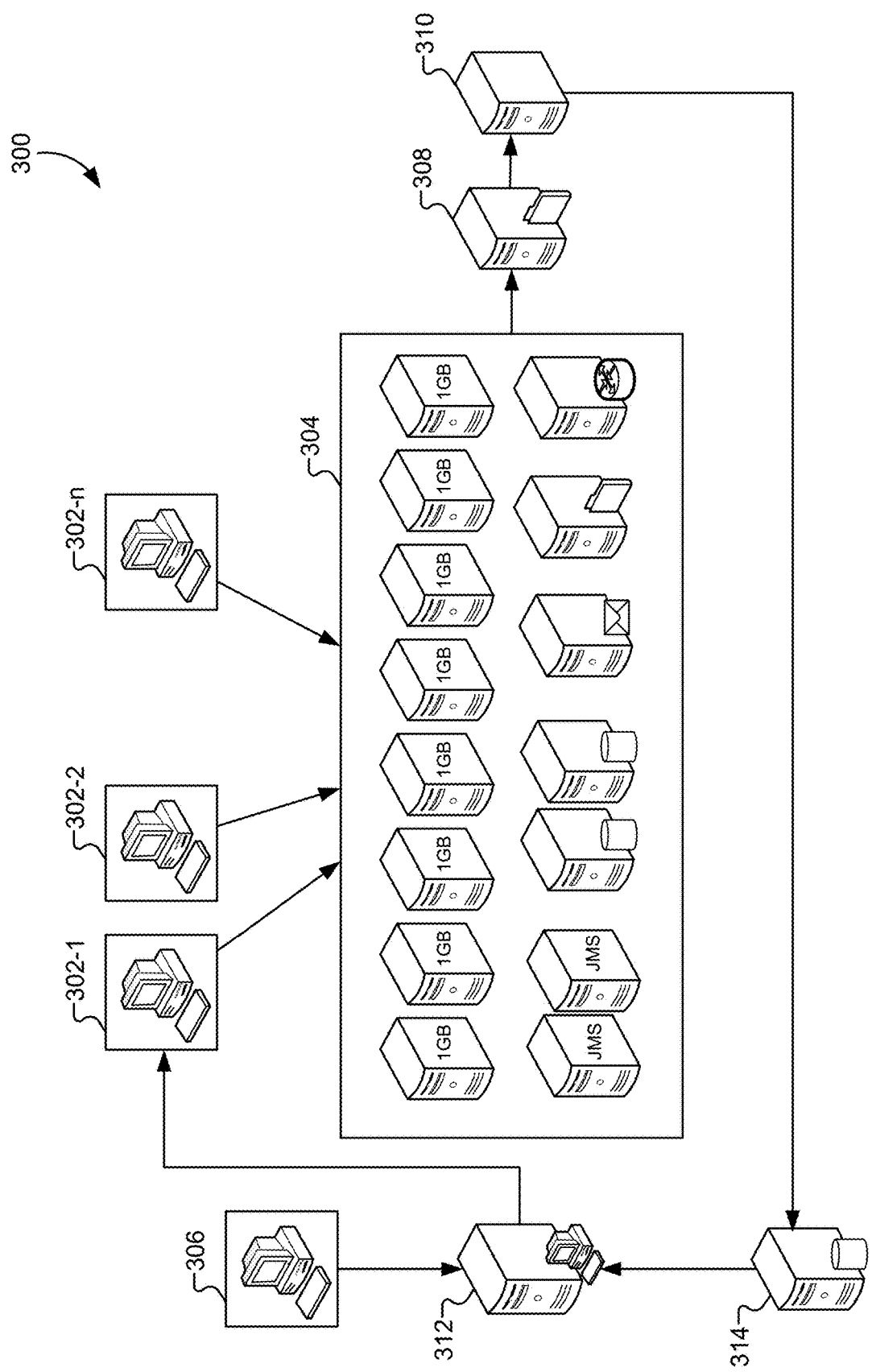
FIG. 3 illustrates a simplified block diagram of multiple computer systems with applications provisioned on a single landing pad resource instance, according to some embodiments.

FIG. 3 illustrates a simplified block diagram 300 of multiple computer systems 302 with applications provisioned on a single landing pad 304 resource instance, according to some embodiments. A management server 312 can provide an administrator workstation 306 at the cloud-based service with a selection of available cloud resources that will make up the landing pad 304. The administrative workstation 306 can receive approvals and/or alterations to the generated landing pad 304. The landing pad 304 may be the first and/or only resource instance generated by the management server 312. A database 314 may store metadata and information for the landing pad 304.

After the landing pad 304 is generated, the management server 312 may begin receiving requests from computer systems 302 of customers. By default, the management server 312 may attach each of the computer systems 302 to the landing pad 304 to provision the requested applications. In some embodiments, one or more of the computer systems 302 may specifically request dedicated hardware for capacity/performance reasons. Despite these specific requests, the management server 312 may assign these computer systems to the landing pad with all of the other incoming requests. If the usage of the computer systems requesting dedicated hardware evolves over time such that they are no longer an efficient fit for the landing pad 304 (i.e., the performance would be less than that of a dedicated resource instance), they may be migrated to a new resource instance via a process that will be described in greater detail below. In contrast, computer systems may specifically request dedicated resource instances for compliance reasons. In some embodiments, these computer systems may forgo being assigned to default landing pad 304, and may instead be assigned to dedicated resource instances that are specially provisioned. Therefore, upon receiving a new request for a dedicated resource instance, the cloud-based service may determine whether the request is based on capacity/performance reasons or based on compliance reasons, and then act as described above.

Over time, as the computer systems 302 are attached to the landing pad 304, they will generate log files, metrics on file servers, metrics in databases, and so forth. A logging system 308 may actively generate and store each of these logs and/or metric records. A background process 310 may periodically run and identify usage factors based on the logs and/or metric records generated by the logging system 308. The background process 310 may also generate scores for each factor for each of the computer systems 302 assigned to the landing pad 304. The background process 310 may use these scores to generate groupings of computer system 302 that may be used to justify leaving each of the computer system 302 assigned to the landing pad 304, or may be used to generate new resource instances and reassign groups of computer systems as will be described in greater detail below.

Instead of providing a static set of factors that are to be evaluated and scored, some embodiments will instead dynamically select factors based on log information and metrics. As the background process 310 analyzes the logs and metrics, the background process 310 can determine which factors are describing usage in a meaningful way for the computer systems 302 in the landing pad 304. For example, if all of the computer systems 302 are actively engaged in reading and writing to/from a database, a "database operations" factor would be among those factors selected. On the other hand, if the computer systems 302 only engage in a relatively small number of database operations, the "database operations" factor would not necessarily be an important indicator of resource usage, and could thus be excluded from the factors selected.

In some embodiments, the background process 310 can analyze the metrics and log files and count the number of words, tags, attributes, and so forth that indicate particular operations. For example, database metrics may record an entry in the metrics for each read/write operation. Each of these operations can then be attributed to a particular computer system. In another example, a log file may record search strings that are provided from users to be executed against a stored website or database. The background process 310 can locate each search string and count the number of searches provided by the particular computer system. After aggregating and grouping each of the operation types found in the logs and metrics, the background process 310 can statistically determine which factors are important indicators of usage in the landing pad 304. For example, the background process 310 can keep all factors with more than a threshold number of operations performed. In another embodiment, the background process 310 can keep all factors representing a top threshold percentage of total operations performed. In some embodiments, input may be received from the administrator workstation 306 to select among the various possible factors found in the logs and metrics, or to edit/approve an automatically generated list of factors. The number of operations for each factor for each computer system can then be aggregated and scores can be developed for each factor. Scores can indicate the total number of operations performed for each factor by each computer system over a time interval.

Figure 4:
FIG. 4 illustrates a simplified table of usage scores with various determined factors, according to some embodiments.

FIG. 4 illustrates a simplified table 400 of usage scores with various determined factors, according to some embodiments. Table 400 illustrates factors that may have been determined to be useful by the background process. A database operations factor 402 may describe reads, writes, queries, etc., for database resources. A file reads factor 404 may describe read operations from a file server. The index builds factor 406 may describe a number of occasions where information in a knowledge base is indexed for searching. A search query factor 408 may describe a number of queries received from users. A document store factor 410 may describe the number of times documents are stored in a file server. It will be understood that many other factors may also be included if they sufficiently describe operations performed on the resource instance of the landing pad as described above.

Each of the factors in table 400 may be specifically linked to one or more particular resource types in the landing pad. For example, the database operations factor 402 may be linked specifically to database resources, such as disk arrays and database servers. The file reads factor 404 and/or the document store factor 410 may be specifically linked to a file server with its associated hardware. Therefore, the scores for each factor may be used to identify hardware/software that are underused in a particular resource instance and/or to identify hardware/software that are causing a performance bottleneck in a particular resource instance.

Scores may be generated for each factor. In table 400, the scores indicate that each of the computer systems in the landing pad have been fairly recently assigned because each of the scores is relatively low. However, the scores for each factor type are generally within an order of magnitude of each other. For example, each of the five computer systems represented in table 400 has seen somewhere around five document store operations for the document store factor 410. Similarly, each of the five computer systems has seen somewhere between five and ten database operations for the database operations factor 402. Because these operations are relatively close for each factor, the background process may leave all of the five computer systems in table 400 in the same group. As there are no obvious outliers in the factor scores, the group of computer systems may remain in the landing pad.

However, the usage of each of the five computer systems in table 400 may evolve over time. The scores for each factor will continue to grow, possibly at different rates for each of the computer systems. For example, the scores of system 4 in table 400 may be due to application testing before the service goes live to clients. After the service goes live, scores for certain factors that are used heavily by users may greatly increase. Is important to note that the scores for the factors are indicative of actual resource usage in the cloud service. Two different computer systems may be running the same applications (e.g., online database storage) but generate very different factor scores based on actual usage. Thus, two very similar computer systems running the same applications may end up with very different usage profiles and may need to be placed in different groups and resource instances. This type of dynamic evaluation generally is not easily known when the application is initially provisioned. This can become clear, however, by analyzing actual usage over time.

Figure 5:
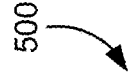
FIG. 5 illustrates a simplified table of usage scores indicating that a new group of computer systems should be formed, according to some embodiments.

FIG. 5 illustrates a simplified table 500 of usage scores indicating that a new group of computer systems should be formed, according to some embodiments. Table 500 may be a version of table 400 after a more prolonged usage interval has occurred. Over time, systems 1-4 have seen their raw scores grow, but the score growth has been relatively uniform. For example, the number of file reads is somewhere between 400 and 500 for each of systems 1-4. Similarly, the number of search queries is approximately 100 for each of systems 1-4. A grouping operation performed by the background process can determine that because the scores for each system are close to each other by a threshold amount (absolute or percentage), systems 1-4 can remain in the same group, and can thus remain in the landing pad resource instance.

In contrast, system 5 shows some significant deviation in certain factor scores. The score 502 for the database operations factor is orders of magnitude higher than the corresponding scores for systems 1-4. Additionally, the score 504 for the file reads factor and the score 506 for the document store factor are both significantly lower than the corresponding scores for these factors for systems 1-4. While systems 1-4 seem to indicate somewhat uniform resource usage for the identified factors, the scores for system 5 indicate that reading/writing documents in a file server is not being used very often, while database operations tend to dominate the usage of system 5. The background process can recognize this difference by comparing the scores for each factor and identifying statistical outliers. In this example, because the scores of system 543 the factors appear as outliers compared to similar scores for systems 1-4, a new computer system group may be established, and system 5 may be moved from the initial landing pad group to this new group.

As described above, each of the factors identified by the background process can be tied to a specific hardware/software resource type provided by the cloud service. When a new group is formed based on deviations in factor scores, the background process can use those factors to determine an optimal set of resources that can be used to service the new computer system group. A new resource instance, which may be referred to herein as a "second resource instance" may be formed. The allocation of resources in the second resource instance may be selected based on the factor scores. For example, in the new group formed by system 5, the number of file servers may be reduced based on the file reads score and the document store score, while the number of database servers may be increased based on the database operations score.

Figure 6:
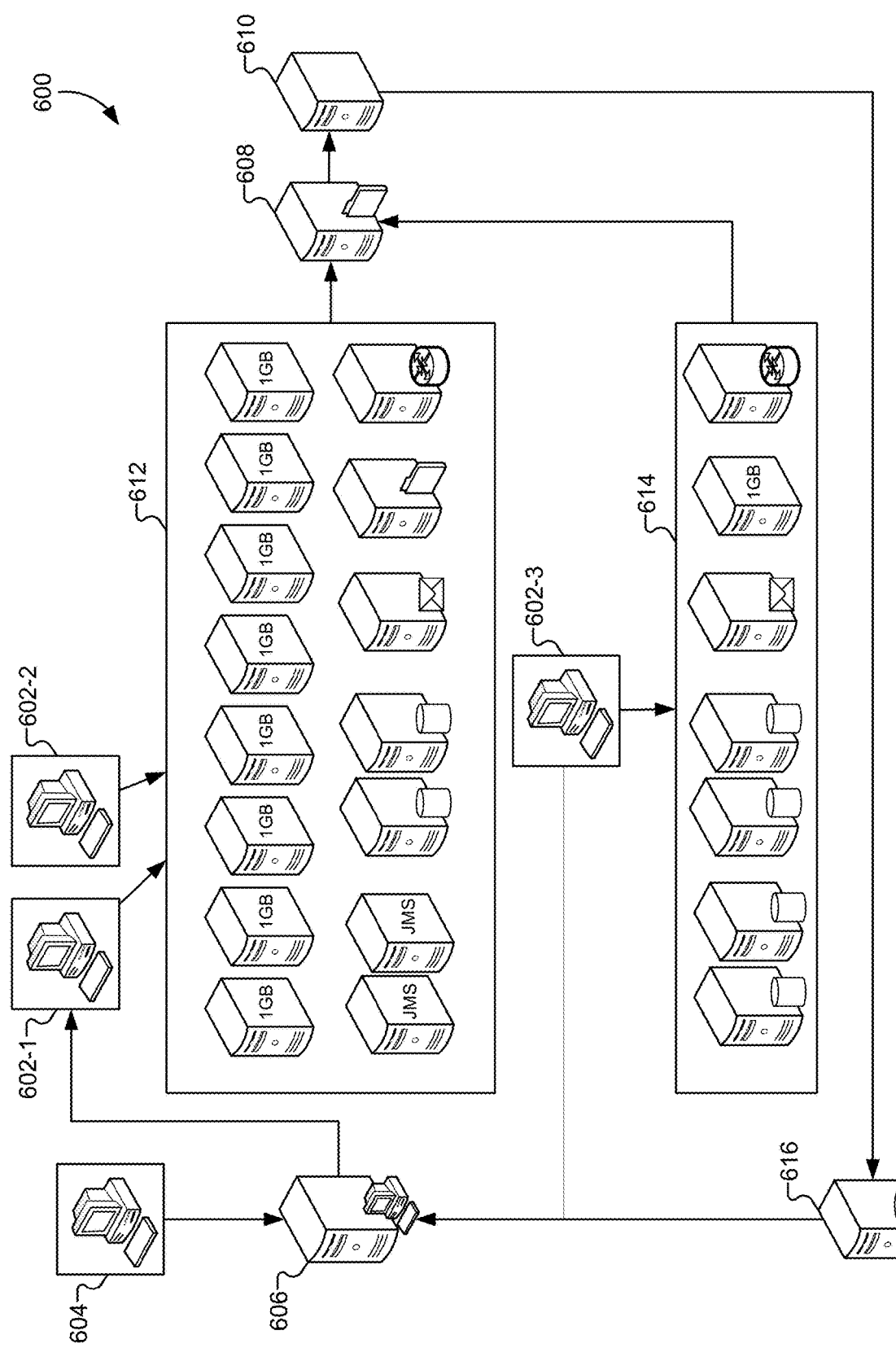
FIG. 6 illustrates a simplified block diagram of a new group migrating to a new resource instance, according to some embodiments.

FIG. 6 illustrates a simplified block diagram 600 of a new group migrating to a new resource instance, according to some embodiments. Block diagram 600 is similar to block diagram 300, the difference being that a second resource instance 614 has been provisioned in addition to the resource instance of the landing pad 612. Computer systems 602-1, 602-2 remain assigned to the landing pad 612. Computer systems 602-1, 602-2 may represent system 1 and system 2 from table 500 (system 3 and system 4 are not shown). The logging system 608 may continue to receive log information and metrics for both the landing pad 612 and the second resource instance 614, and the background process 610 may continue to evaluate all systems in the cloud-based service to determine when new groups need to be formed with corresponding new resource instances. The database 616 will store metadata for each resource instance and assignments of computer systems to resource instances.

After identifying a new group, the background process 610 can automatically generate an optimal resource instance definition to service the new group. The background process 610 can then provide its recommendation to the management server 606 where approvals/alterations can be received from the administrator workstation 604. The second resource instance 614 can then be automatically provisioned and computer system 602-3 (representing system 5 from table 500) may be migrated to the second resource instance 614. Because the second resource instance 614 can be provisioned while computer system 602-3 continues to operate in the landing pad 612, the migration of computer system 602-3 will be seamless from the customer perspective and need not cause any interruption in service.

Figure 7:
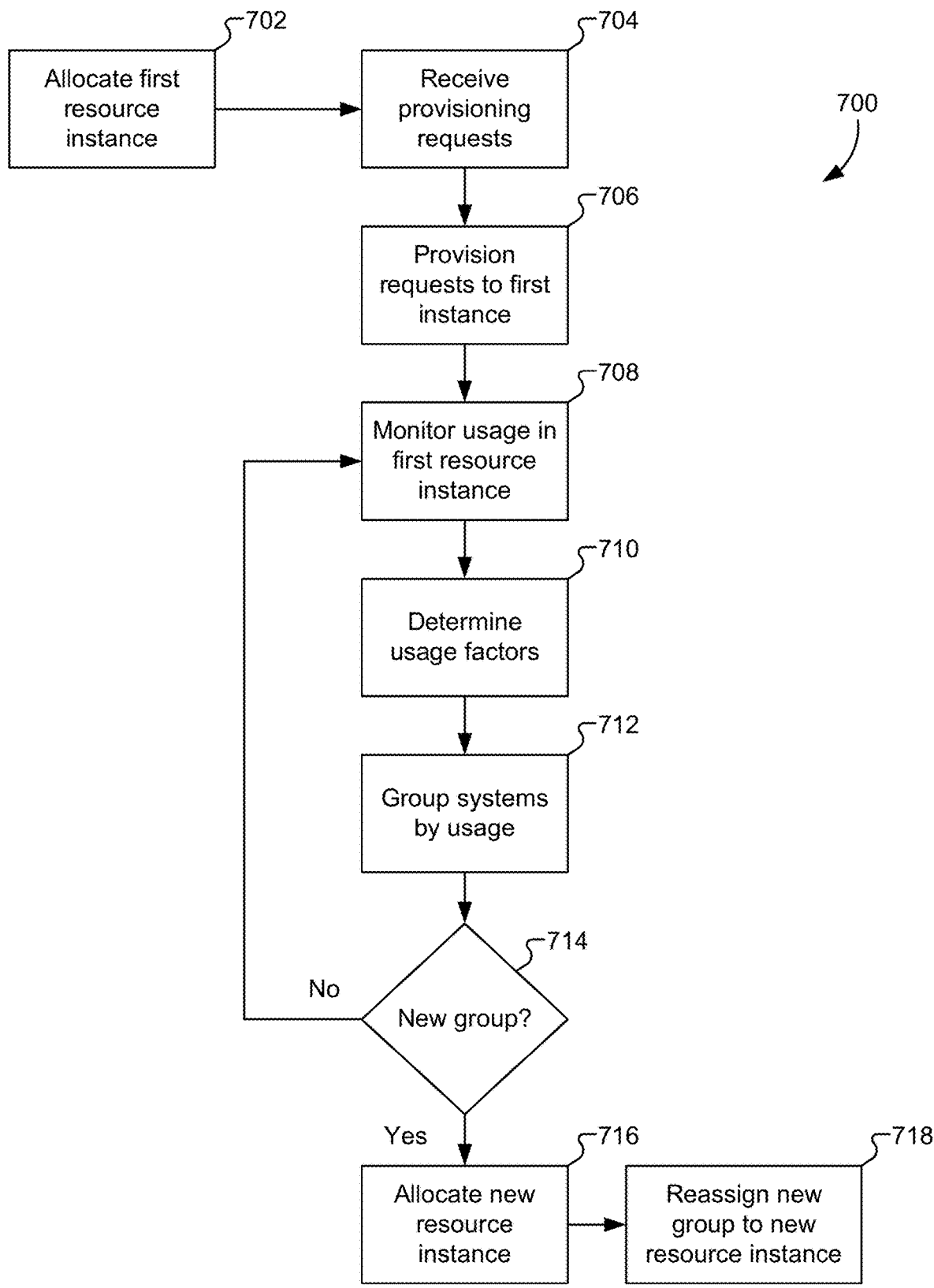
FIG. 7 illustrates a flowchart of a method for provisioning computer systems through a landing pad, according to some embodiments.

FIG. 7 illustrates a flowchart 700 of a method for provisioning computer systems through a landing pad, or first resource instance, according to some embodiments. The method may include allocating a first resource instance (702). The first resource instance may include a selection of hardware/software resources that can handle any of the applications being provisioned by the cloud computing environment. The first resource instance may be determined based on a combination of the resources used by different applications available from the cloud computing environment.

The method may also include receiving request from a plurality of computer systems to provision applications available in the cloud computing environment (704). Each computer system may represent a different customer of the cloud computing environment. Provisioning applications may include making cloud-based services available, such as customer relationship management packages, email and website hosting, form automation, data storage and retrieval, and so forth.

The method may additionally include provisioning each of the requests by assigning each of the plurality of computer systems to the first resource instance, such that the applications are executed for each of the plurality of computer systems on the first resource instance (706). The first resource instance may act as a landing pad for every new incoming request, and the computer systems may remain assigned to the first resource instance until their actual resource usage exhibits a sufficiently large deviation from the resource usage of the rest of the computer systems. In some embodiments, it may be determined that a computer system has requested dedicated instances for capacity or performance reasons. These types requests may also be assigned to the first resource instance. On the other hand, it may be determined that a computer system has requested dedicated instances for compliance reasons. These types of requests may be assigned to dedicated resource instances instead of the first computing resource.

The method may further include monitoring usage of resources in the first resource instance for each of the plurality of computer systems (708). In some embodiments, monitoring usage of the resources in the first resource instance may include generating log files for each of the plurality computer systems. This may also include generating metrics on one or more file servers in the first resource instance. This may also include generating metrics-based inquiries to one or more database servers in the first resource instance. In some embodiments, a logging system may perform Java logging using Java Management Extension (JMX) queries and database queries.

The method may also include identifying a plurality of usage factors that are shared by each of the plurality computer systems as they use the first resource instance (710). The usage factors may be identified by a background process that periodically scans usage logs, metrics on one or more file servers, and metrics based on queries to one or more database servers. For example, the usage factors may be identified by determining a set of most-frequently-used words in the usage log. Factors may also be identified by selecting metrics with the highest recorded numerical values. Each of the usage factors may be assigned a score based on actual resource usage of the computer systems over time. In some embodiments, an administrative workstation may assign a maximum number of factors to use (e.g., 5 factors).

The method may additionally include grouping each of the plurality computer systems into a plurality of groups based on the usage of the resources in the first resource instance (712). The groups may be determined by statistically grouping the plurality of computer systems based on proximities of the scores for each of the plurality of usage factors. If one or more computer systems have scores that deviate sufficiently (e.g., more than a threshold amount or percentage) from the rest of the group, a new group or class of computer systems may be formed. The new group may represent a different class of resource usage than the existing computer systems that will remain in the first resource instance. If no scores have deviated sufficiently from the norm, the background process can continue monitoring resource usage until such a condition occurs (708).

To facilitate the creation of a new group of computer systems, the method may include allocating a second resource instance in the cloud computing environment (716). The second resource instance may analyze the way in which the usage scores of the computer systems in the new group deviate from the scores of the computer systems in the first instance, and then adjust the resource allocation of first resource instance in order to form the second resource instance. In some embodiments, the new group and second resource instance may be presented to an administrative workstation through a user interface for approval/adjustments. Once approved, the method may include reassigning computer systems in new group from the first resource instance to the second resource instance. This migration may be completely automated and transparent to the affected computer systems.

It should be appreciated that the specific steps illustrated in FIG. 7 provide particular methods of provisioning through a landing pad according to various embodiments of the present invention. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 8:
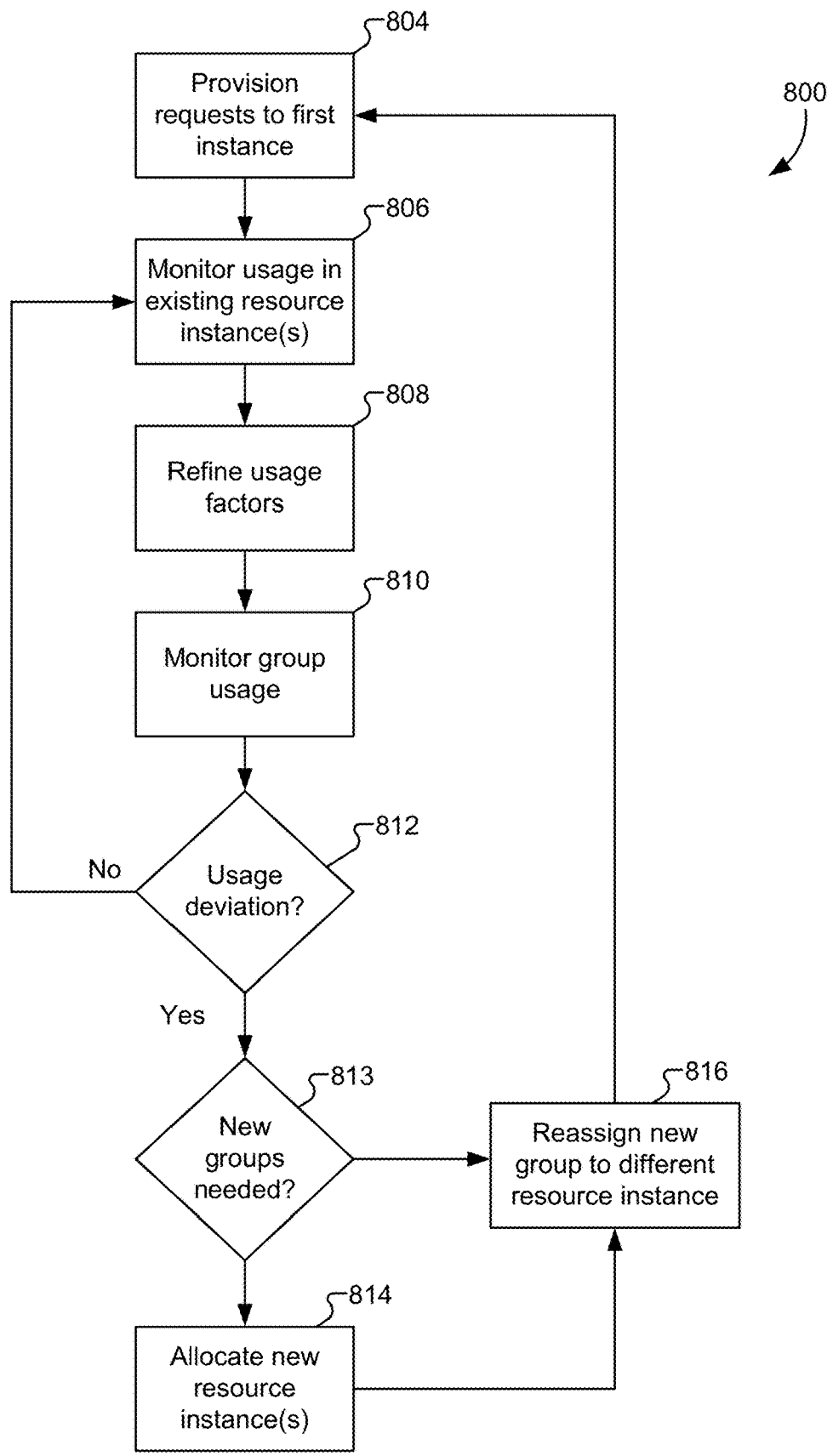
FIG. 8 illustrates a flowchart of a method for adding new systems according to usage scores, according to some embodiments.

FIG. 8 illustrates a flowchart 800 of a method for adding new systems to existing resource instances, according to some embodiments. Over time, the number of resource instances may expand to include an optimal number of resource instances that match actual usage profiles for all of the existing computer systems. For example, one embodiment may use between 5 and 10 different resource instances, depending on the size of the cloud service. The method of flowchart 800 illustrates how new computer systems can be added to a multi-resource-instance environment. When a new provisioning request is received, the new computer system can be provisioned to the first resource instance, or landing pad (804). As described above, the method may then monitor resource usage in the existing resource instances (806) based on previously determined usage factors. In this method, the usage factors being examined can also be refined over time (808). Recall that the usage factors were initially determined based on which resources were being most heavily used. As computer system usage of the resources evolves over time, the usage factors may also similarly evolve. For example, a computer system may initially use file storage operations extensively in order to upload content to the cloud service. However, after a few weeks, the file storage operations may decrease dramatically, and the search query operations may increase instead. In some embodiments, the usage factor for file storage operations may eventually be replaced by a usage factor for search query operations as this evolution takes place.

The method may also include monitoring group usage of the resource instances for each group (810). Each group of computer systems can be analyzed individually. If usage deviations are detected in any one group (812), then new groups may be formed, or computer systems can move between groups. For example, a computer system may initially have a resource usage profile that aligns with that of the landing pad. However, over time, the computer system may develop a resource usage profile that aligns more closely with the usage profile of computer systems in another group. The usage profile statistics can be clustered together to optimally match groups of usage profiles together with corresponding resource instances. In some cases, one or more computer systems may develop usage profiles that no longer match any of the existing resource instances (813). In this case, a new group may be formed (814), and a new resource instance may be allocated in order to match the resource usage of the group. The computer systems that need to be moved between groups can then be reassigned to tnew and/or existing resource instances (816) without any noticeable effect for the actual customer using the computer systems.

It should be appreciated that the specific steps illustrated in FIG. 8 provide particular methods of provisioning new systems according to various embodiments of the present invention. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 9:
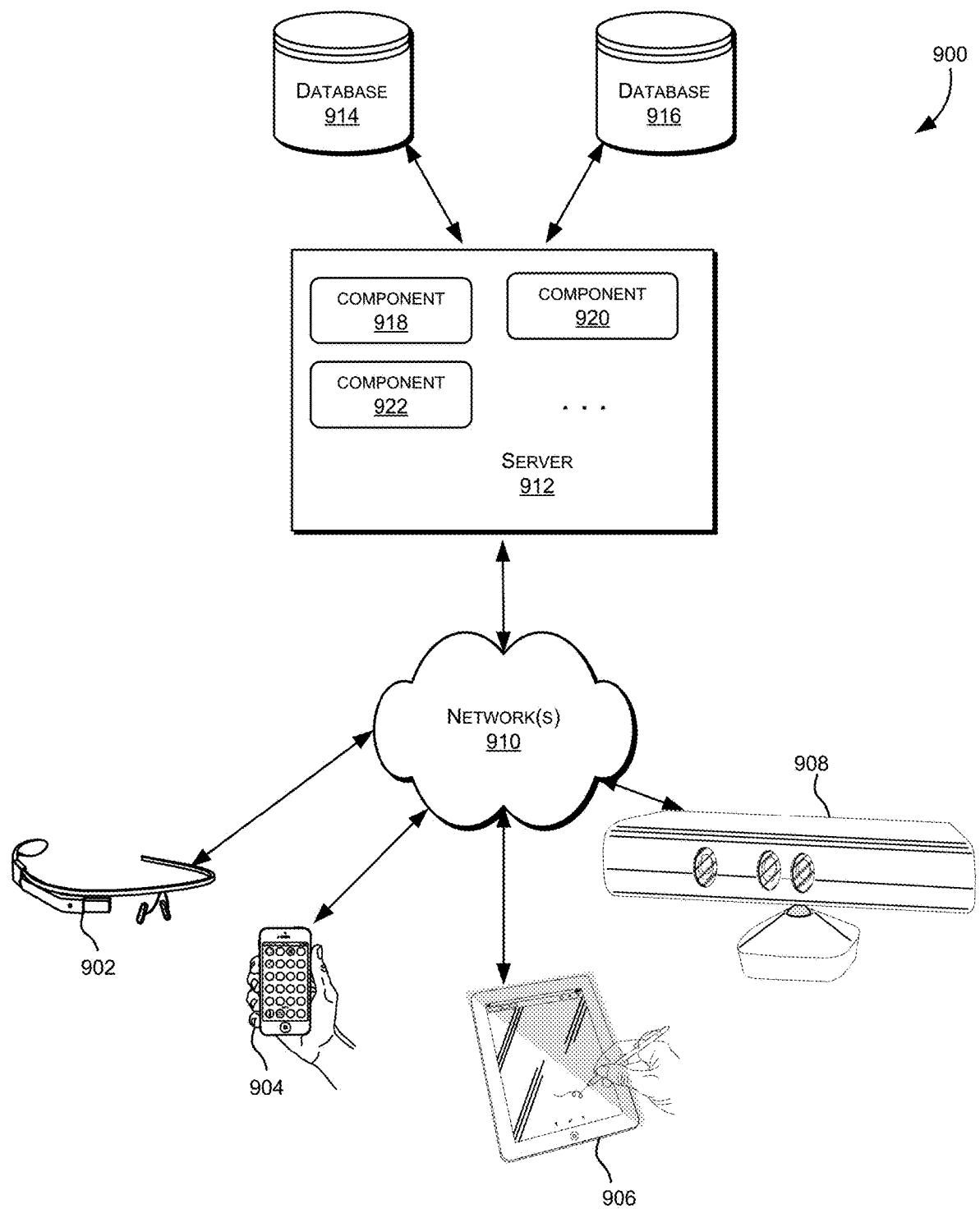
FIG. 9 illustrates a simplified block diagram of a distributed system for implementing some of the embodiments.

FIG. 9 depicts a simplified diagram of a distributed system 900 for implementing one of the embodiments. In the illustrated embodiment, distributed system 900 includes one or more client computing devices 902, 904, 906, and 908, which are configured to execute and operate a client application such as a web browser, proprietary client (e.g., Oracle Forms), or the like over one or more network(s) 910. Server 912 may be communicatively coupled with remote client computing devices 902, 904, 906, and 908 via network 910.

In various embodiments, server 912 may be adapted to run one or more services or software applications provided by one or more of the components of the system. In some embodiments, these services may be offered as web-based or cloud services or under a Software as a Service (SaaS) model to the users of client computing devices 902, 904, 906, and/or 908. Users operating client computing devices 902, 904, 906, and/or 908 may in turn utilize one or more client applications to interact with server 912 to utilize the services provided by these components.

In the configuration depicted in the figure, the software components 918, 920 and 922 of system 900 are shown as being implemented on server 912. In other embodiments, one or more of the components of system 900 and/or the services provided by these components may also be implemented by one or more of the client computing devices 902, 904, 906, and/or 908. Users operating the client computing devices may then utilize one or more client applications to use the services provided by these components. These components may be implemented in hardware, firmware, software, or combinations thereof. It should be appreciated that various different system configurations are possible, which may be different from distributed system 900. The embodiment shown in the figure is thus one example of a distributed system for implementing an embodiment system and is not intended to be limiting.

Client computing devices 902, 904, 906, and/or 908 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry®, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 902, 904, 906, and 908 may be any other electronic device, such as a thin-client computer, an Internet-enabled gaming system (e.g., a Microsoft Xbox gaming console with or without a Kinect® gesture input device), and/or a personal messaging device, capable of communicating over network(s) 910.

Although exemplary distributed system 900 is shown with four client computing devices, any number of client computing devices may be supported. Other devices, such as devices with sensors, etc., may interact with server 912.

Network(s) 910 in distributed system 900 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 910 can be a local area network (LAN), such as one based on Ethernet, Token-Ring and/or the like. Network(s) 910 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 912 may be adapted to run one or more services or software applications described in the foregoing disclosure. For example, server 912 may correspond to a server for performing processing described above according to an embodiment of the present disclosure.

Server 912 may run an operating system including any of those discussed above, as well as any commercially available server operating system. Server 912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 912 may include one or more applications to analyze and consolidate data feeds and/or event updates received from users of client computing devices 902, 904, 906, and 908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 912 may also include one or more applications to display the data feeds and/or real-time events via one or more display devices of client computing devices 902, 904, 906, and 908.

Distributed system 900 may also include one or more databases 914 and 916. Databases 914 and 916 may reside in a variety of locations. By way of example, one or more of databases 914 and 916 may reside on a non-transitory storage medium local to (and/or resident in) server 912. Alternatively, databases 914 and 916 may be remote from server 912 and in communication with server 912 via a network-based or dedicated connection. In one set of embodiments, databases 914 and 916 may reside in a storage-area network (SAN). Similarly, any necessary files for performing the functions attributed to server 912 may be stored locally on server 912 and/or remotely, as appropriate. In one set of embodiments, databases 914 and 916 may include relational databases, such as databases provided by Oracle, that are adapted to store, update, and retrieve data in response to SQL-formatted commands.

Figure 10:
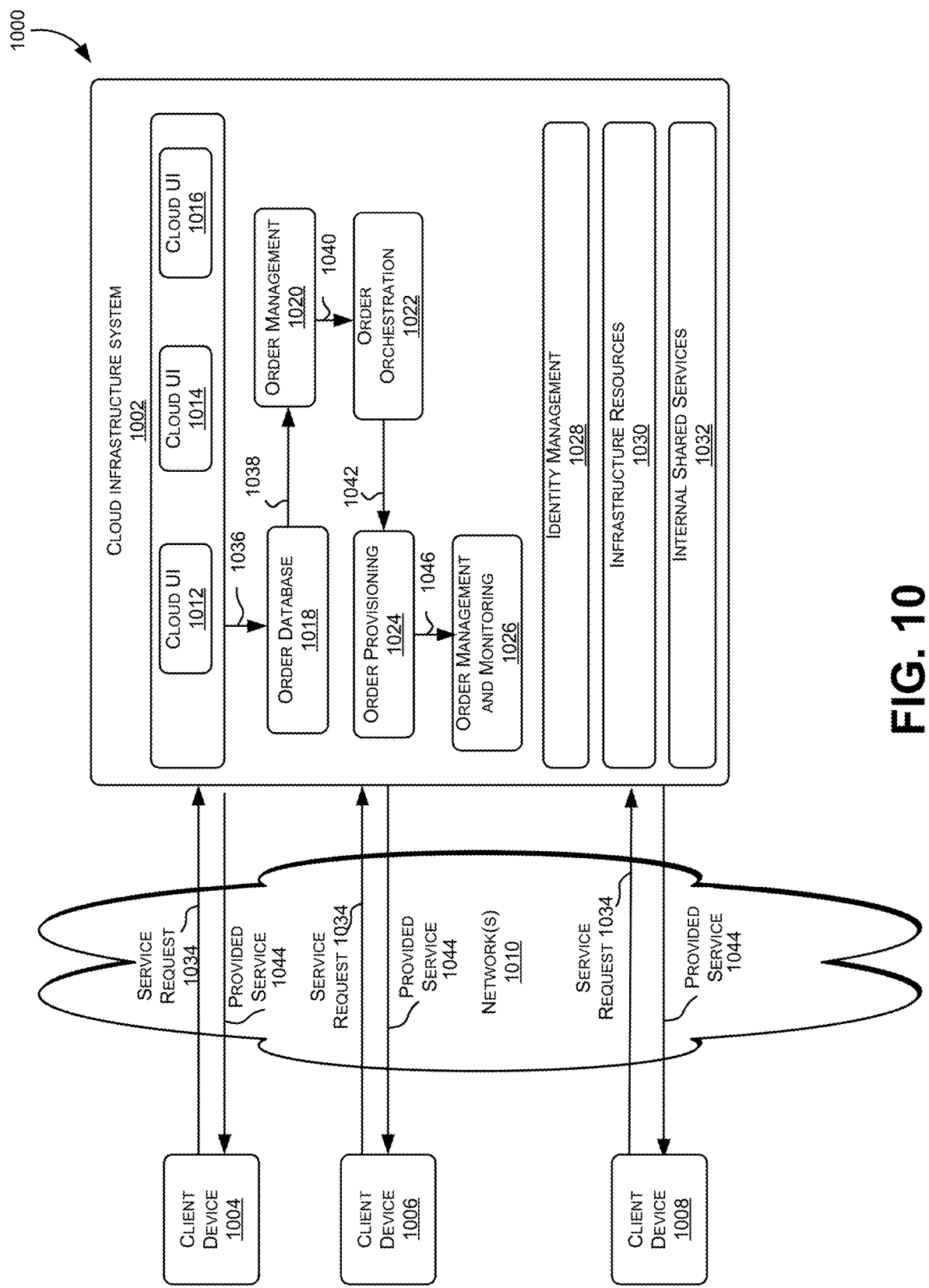
FIG. 10 illustrates a simplified block diagram of components of a system environment by which services provided by the components of an embodiment system may be offered as cloud services.

FIG. 10 is a simplified block diagram of one or more components of a system environment 1000 by which services provided by one or more components of an embodiment system may be offered as cloud services, in accordance with an embodiment of the present disclosure. In the illustrated embodiment, system environment 1000 includes one or more client computing devices 1004, 1006, and 1008 that may be used by users to interact with a cloud infrastructure system 1002 that provides cloud services. The client computing devices may be configured to operate a client application such as a web browser, a proprietary client application (e.g., Oracle Forms), or some other application, which may be used by a user of the client computing device to interact with cloud infrastructure system 1002 to use services provided by cloud infrastructure system 1002.

It should be appreciated that cloud infrastructure system 1002 depicted in the figure may have other components than those depicted. Further, the embodiment shown in the figure is only one example of a cloud infrastructure system that may incorporate an embodiment of the invention. In some other embodiments, cloud infrastructure system 1002 may have more or fewer components than shown in the figure, may combine two or more components, or may have a different configuration or arrangement of components.

Client computing devices 1004, 1006, and 1008 may be devices similar to those described above for 902, 904, 906, and 908.

Although exemplary system environment 1000 is shown with three client computing devices, any number of client computing devices may be supported. Other devices such as devices with sensors, etc. may interact with cloud infrastructure system 1002.

Network(s) 1010 may facilitate communications and exchange of data between clients 1004, 1006, and 1008 and cloud infrastructure system 1002. Each network may be any type of network familiar to those skilled in the art that can support data communications using any of a variety of commercially-available protocols, including those described above for network(s) 910.

Cloud infrastructure system 1002 may comprise one or more computers and/or servers that may include those described above for server 912.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1002 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1002 may be adapted to automatically provision, manage and track a customer's subscription to services offered by cloud infrastructure system 1002. Cloud infrastructure system 1002 may provide the cloud services via different deployment models. For example, services may be provided under a public cloud model in which cloud infrastructure system 1002 is owned by an organization selling cloud services (e.g., owned by Oracle) and the services are made available to the general public or different industry enterprises. As another example, services may be provided under a private cloud model in which cloud infrastructure system 1002 is operated solely for a single organization and may provide services for one or more entities within the organization. The cloud services may also be provided under a community cloud model in which cloud infrastructure system 1002 and the services provided by cloud infrastructure system 1002 are shared by several organizations in a related community. The cloud services may also be provided under a hybrid cloud model, which is a combination of two or more different models.

In some embodiments, the services provided by cloud infrastructure system 1002 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1002. Cloud infrastructure system 1002 then performs processing to provide the services in the customer's subscription order.

In some embodiments, the services provided by cloud infrastructure system 1002 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1002 may also include infrastructure resources 1030 for providing the resources used to provide various services to customers of the cloud infrastructure system. In one embodiment, infrastructure resources 1030 may include pre-integrated and optimized combinations of hardware, such as servers, storage, and networking resources to execute the services provided by the PaaS platform and the SaaS platform.

In some embodiments, resources in cloud infrastructure system 1002 may be shared by multiple users and dynamically re-allocated per demand. Additionally, resources may be allocated to users in different time zones. For example, cloud infrastructure system 1030 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1032 may be provided that are shared by different components or modules of cloud infrastructure system 1002 and by the services provided by cloud infrastructure system 1002. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1002 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1002, and the like.

In one embodiment, as depicted in the figure, cloud management functionality may be provided by one or more modules, such as an order management module 1020, an order orchestration module 1022, an order provisioning module 1024, an order management and monitoring module 1026, and an identity management module 1028. These modules may include or be provided using one or more computers and/or servers, which may be general purpose computers, specialized server computers, server farms, server clusters, or any other appropriate arrangement and/or combination.

In exemplary operation 1034, a customer using a client device, such as client device 1004, 1006 or 1008, may interact with cloud infrastructure system 1002 by requesting one or more services provided by cloud infrastructure system 1002 and placing an order for a subscription for one or more services offered by cloud infrastructure system 1002. In certain embodiments, the customer may access a cloud User Interface (UI), cloud UI 1012, cloud UI 1014 and/or cloud UI 1016 and place a subscription order via these UIs. The order information received by cloud infrastructure system 1002 in response to the customer placing an order may include information identifying the customer and one or more services offered by the cloud infrastructure system 1002 that the customer intends to subscribe to.

After an order has been placed by the customer, the order information is received via the cloud UIs, 1012, 1014 and/or 1016.

At operation 1036, the order is stored in order database 1018. Order database 1018 can be one of several databases operated by cloud infrastructure system 1018 and operated in conjunction with other system elements.

At operation 1038, the order information is forwarded to an order management module 1020. In some instances, order management module 1020 may be configured to perform billing and accounting functions related to the order, such as verifying the order, and upon verification, booking the order.

At operation 1040, information regarding the order is communicated to an order orchestration module 1022. Order orchestration module 1022 may utilize the order information to orchestrate the provisioning of services and resources for the order placed by the customer. In some instances, order orchestration module 1022 may orchestrate the provisioning of resources to support the subscribed services using the services of order provisioning module 1024.

In certain embodiments, order orchestration module 1022 enables the management of business processes associated with each order and applies business logic to determine whether an order should proceed to provisioning. At operation 1042, upon receiving an order for a new subscription, order orchestration module 1022 sends a request to order provisioning module 1024 to allocate resources and configure those resources needed to fulfill the subscription order. Order provisioning module 1024 enables the allocation of resources for the services ordered by the customer. Order provisioning module 1024 provides a level of abstraction between the cloud services provided by cloud infrastructure system 1000 and the physical implementation layer that is used to provision the resources for providing the requested services. Order orchestration module 1022 may thus be isolated from implementation details, such as whether or not services and resources are actually provisioned on the fly or pre-provisioned and only allocated/assigned upon request.

At operation 1044, once the services and resources are provisioned, a notification of the provided service may be sent to customers on client devices 1004, 1006 and/or 1008 by order provisioning module 1024 of cloud infrastructure system 1002.

At operation 1046, the customer's subscription order may be managed and tracked by an order management and monitoring module 1026. In some instances, order management and monitoring module 1026 may be configured to collect usage statistics for the services in the subscription order, such as the amount of storage used, the amount data transferred, the number of users, and the amount of system up time and system down time.

In certain embodiments, cloud infrastructure system 1000 may include an identity management module 1028. Identity management module 1028 may be configured to provide identity services, such as access management and authorization services in cloud infrastructure system 1000. In some embodiments, identity management module 1028 may control information about customers who wish to utilize the services provided by cloud infrastructure system 1002. Such information can include information that authenticates the identities of such customers and information that describes which actions those customers are authorized to perform relative to various system resources (e.g., files, directories, applications, communication ports, memory segments, etc.) Identity management module 1028 may also include the management of descriptive information about each customer and about how and by whom that descriptive information can be accessed and modified.

Figure 11:
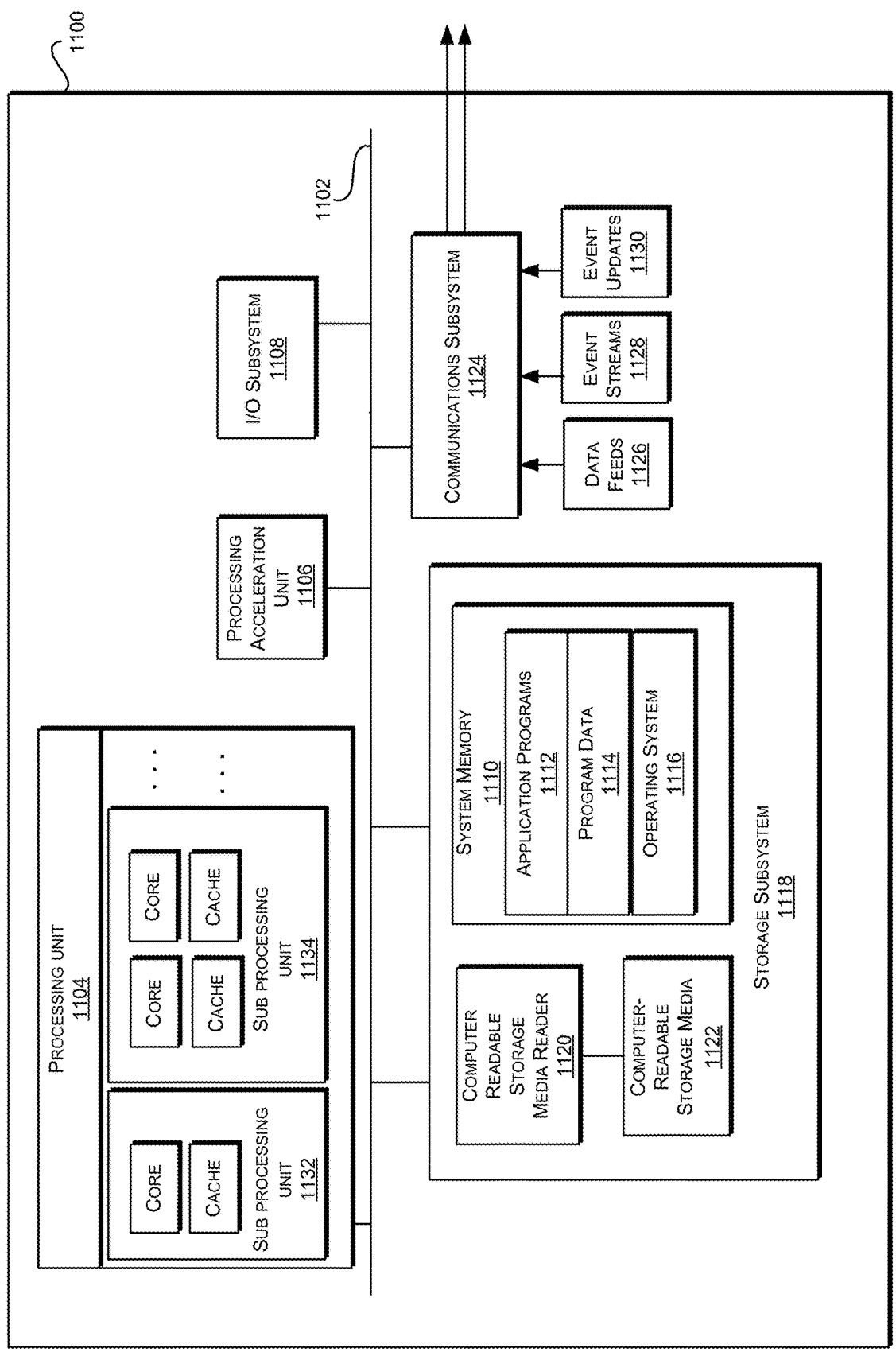
FIG. 11 illustrates an exemplary computer system, in which various embodiments may be implemented.

FIG. 11 illustrates an exemplary computer system 1100, in which various embodiments of the present invention may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1118 may also provide a tangible computer-readable storage medium for storing the basic programming and data constructs that provide the functionality of some embodiments. Software (programs, code modules, instructions) that when executed by a processor provide the functionality described above may be stored in storage subsystem 1118. These software modules or instructions may be executed by processing unit 1104. Storage subsystem 1118 may also provide a repository for storing data used in accordance with the present invention.

Storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1100.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have beeen described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of provisioning cloud-based applications, the method comprising:
receiving requests from a plurality of client computer systems to provision applications available in a cloud computing environment, wherein the client computer systems interact with the applications provided in the cloud computing environment;
assigning each of the plurality of client computer systems to a first resource instance in the cloud computing environment, such that the applications are executed for each of the plurality of client computer systems on the first resource instance;

monitoring usage of resources in the first resource instance for each of the plurality of client computer systems by
  (i) counting a number of recorded operations for each of a plurality of usage factors, wherein each of the usage factors describe particular types of operations;
  (ii) determining a particular usage factor belonging to the plurality of usage factors to be an important indicator of usage in the first resource instance based at least in part on the number of recorded operations described by the particular usage factor; and
  (iii) counting a total number of operations described by the particular usage factor to develop a usage score for the client computer system;

grouping each of the plurality of client computer systems into a plurality of groups based on the usage of the resources in the first resource instance indicated by the usage scores for the client computer systems, wherein a first group in the plurality of groups has a first usage of the resources that is not an efficient fit for the first resource instance;

allocating a second resource instance in the cloud computing environment, wherein the second resource instance is optimized to service the first usage; and reassigning all client computer systems in the first group from the first resource instance to the second resource instance.

2. The method of claim 1, wherein the first resource instance comprises a virtual machine, a message-oriented middleware server, a database server, a Simple Mail Transfer Protocol server, a file server, and a router.

3. The method of claim 1, further comprising:
after reassigning the client computer systems in the first group:
  receiving a request from a first client computer system to provision at least one of the applications available in the cloud computing environment;
  determining that the first client computer system has requested instances not shared with computer systems of other customers for capacity or performance reasons; and
  assigning the first client computer system to the first resource instance;
wherein the first resource instance is shared with computer systems of other customers.

4. The method of claim 1, further comprising:
after reassigning the client computer systems in the first group:
  receiving a request from a first client computer system to provision at least one of the applications available in the cloud computing environment; and
  determining that the first client computer system has requested instances not shared with computer systems of other customers for compliance reasons; and
  assigning the first client computer system to a resource instance not shared with computer systems of other customers instead of the first resource instance.

5. The method of claim 1, wherein monitoring the usage of the resources in the first resource instance for each of the plurality of client computer systems comprises:
  generating log files for each of the plurality of client computer systems, wherein the counting the number of recorded operations includes counting operations recorded in the log files.

6. The method of claim 1, wherein monitoring the usage of the resources in the first resource instance for each of the plurality of client computer systems further comprises:
  generating file server metrics for one or more file servers in the first resource instance, wherein the counting the number of recorded operations includes counting operations recorded in the file server metrics.

7. The method of claim 1, wherein monitoring the usage of the resources in the first resource instance for each of the plurality of client computer systems further comprises:
  generating database metrics based on queries to one or more database servers in the first resource instance, wherein the counting the number of recorded operations includes counting operations recorded in the database metrics.

8. The method of claim 1, wherein:
the second resource instance is provisioned while the first group continues to operate in the in the first resource instance; and
the transition for the first group from the first resource instance to the second resource instance is without interruption in service to the client computer systems of the first group.

9. A non-transitory, computer-readable medium comprising instructions that, when executed by one or more processors, causes the one or more processors to perform operations comprising:

receiving requests from a plurality of client computer systems to provision applications available in a cloud computing environment, wherein the client computer systems interact with the applications provided in the cloud computing environment;

assigning each of the plurality of client computer systems to a first resource instance in the cloud computing environment, such that the applications are executed for each of the plurality of client computer systems on the first resource instance;

monitoring usage of resources in the first resource instance for each of the plurality of client computer systems by
  (i) counting a number of recorded operations for each of a plurality of usage factors, wherein each of the usage factors describe particular types of operations;
  (ii) determining a particular usage factor belonging to the plurality of usage factors to be an important indicator of usage in the first resource instance based at least in part on the number of recorded operations described by the particular usage factor; and
  (iii) counting a total number of operations described by the particular usage factor to develop a score for the client computer system;

grouping each of the plurality of client computer systems into a plurality of groups based on the usage of the resources in the first resource instance indicated by the scores for the client computer systems, wherein a first group in the plurality of groups has a first usage of the resources that is not an efficient fit for the first resource instance;

allocating a second resource instance in the cloud computing environment, wherein the second resource instance is optimized to service the first usage; and reassigning all client computer systems in the first group from the first resource instance to the second resource instance.

10. The non-transitory, computer-readable medium of claim 9 comprising additional instructions that cause the one or more processors to perform additional operations comprising:
identifying the plurality of usage factors to be those usage factors that are shared by each of the plurality of client computer systems as they use the first resource instance.

11. The non-transitory, computer-readable medium of claim 9, wherein the plurality of usage factors are identified by a background process that periodically scans usage logs, metrics on one or more file servers, and metrics based on queries to one or more database servers.

12. The non-transitory, computer-readable medium of claim 9, wherein the plurality of usage factors are identified by identifying a set of most-frequently-used words in a usage log.

13. The non-transitory, computer-readable medium of claim 9, wherein the plurality of usage factors are identified by identifying metrics with a highest numerical value.

14. The non-transitory, computer-readable medium of claim 9, wherein grouping each of the plurality of client computer systems into the plurality of groups comprises:
statistically grouping the plurality of client computer systems based on proximities of the scores for each of the plurality of usage factors; and
identifying the first group by determining it to be a statistical outlier from other groups of the plurality of groups.

15. The non-transitory, computer-readable medium of claim 9, wherein allocating the second resource instance in the cloud computing environment comprises:
allocating a plurality of computing resources according to the first resource instance; and
increasing or decreasing a number of particular types of computing resources in the second resource instance according to the usage of the resources by the first group in the first resource instance.

16. A system comprising:
one or more processors; and
one or more memory devices comprising instructions that, when executed by the one or more processors, cause the one or more processors to perform operations comprising:
receiving requests from a plurality of client computer systems to provision applications available in a cloud computing environment, wherein the client computer systems interact with the applications provided in the cloud computing environment;
assigning each of the plurality of client computer systems to a first resource instance in the cloud computing environment, such that the applications are executed for each of the plurality of client computer systems on the first resource instance;
monitoring usage of resources in the first resource instance for each of the plurality of client computer systems by
(i) counting a number of recorded operations for each of a plurality of usage factors, wherein each of the usage factors describe particular types of operations;
(ii) determining a particular usage factor belonging to the plurality of usage factors to be an important indicator of usage in the first resource instance based at least in part on the number of recorded operations described by the particular usage factor; and
(iii) counting a total number of operations described by the particular usage factor to develop a score for the client computer system;
grouping each of the plurality of client computer systems into a plurality of groups based on the usage of the resources in the first resource instance indicated by the scores for the client computer systems, wherein a first group in the plurality of groups has a first usage of the resources that is not an efficient fit for the first resource instance;
allocating a second resource instance in the cloud computing environment, wherein the second resource instance is optimized to service the first usage; and
reassigning all client computer systems in the first group from the first resource instance to the second resource instance.

17. The system of claim 16, wherein allocating the second resource instance in the cloud computing environment comprises:
allocating a plurality of computing resources according to usage requirements of the client computer systems in the first group as determined by the usage of the resources by the first group in the first resource instance.

18. The system of claim 16, wherein the one or more memory devices further comprise additional instructions that cause the one or more processors to perform additional operations comprising:
after reassigning the client computer systems in the first group:
receiving a request from a first client computer system to provision at least one of the applications available in the cloud computing environment;
determining that the first client computer system has requested instances not shared with computer systems of other customers for capacity or performance reasons; and
assigning the first client computer system to the first resource instance.

19. The system of claim 16, wherein the one or more memory devices further comprise additional instructions that cause the one or more processors to perform additional operations comprising:
generating log files for each of the plurality of client computer systems;
generating file server metrics on one or more file servers in the first resource instance; and
generating database metrics based on queries to one or more database servers in the first resource instance;
wherein the counting the number of recorded operations includes counting operations recorded in the log files, file server metrics, and the database metrics.

20. The system of claim 16 wherein grouping each of the plurality of client computer systems into the plurality of groups comprises:
statistically grouping the plurality of client computer systems based on proximities of the scores for each of the plurality of usage factors; and
identifying the first group by determining it to have scores that deviate more than a threshold amount from the scores of the client computer systems in other groups of the plurality of groups.

* * * * *

UNITED STATES PATENT AND TRADEMARK OFFICE
CERTIFICATE OF CORRECTION

PATENT NO. : 10,554,751 B2
APPLICATION NO. : 15/008087
DATED : February 4, 2020
INVENTOR(S) : Vedula Page 1 of 1

It is certified that error appears in the above-identified patent and that said Letters Patent is hereby corrected as shown below:

In the Specification

In Column 12, Line 23, delete "tnew" and insert -- new --, therefor.

In Column 13, Lines 45-46, delete "BlackBerry®," and insert -- BlackBerry 10, --, therefor.

In Column 23, Line 60, delete "beeen" and insert -- been --, therefor.

In the Claims

In Column 26, Line 19, in Claim 8, before "first" delete "in the".

Signed and Sealed this
Tenth Day of November, 2020

Andrei Iancu
*Director of the United States Patent and Trademark Office*